J. H. WAGENHORST.
DEMOUNTABLE RIM FASTENING.
APPLICATION FILED OCT. 4, 1915.

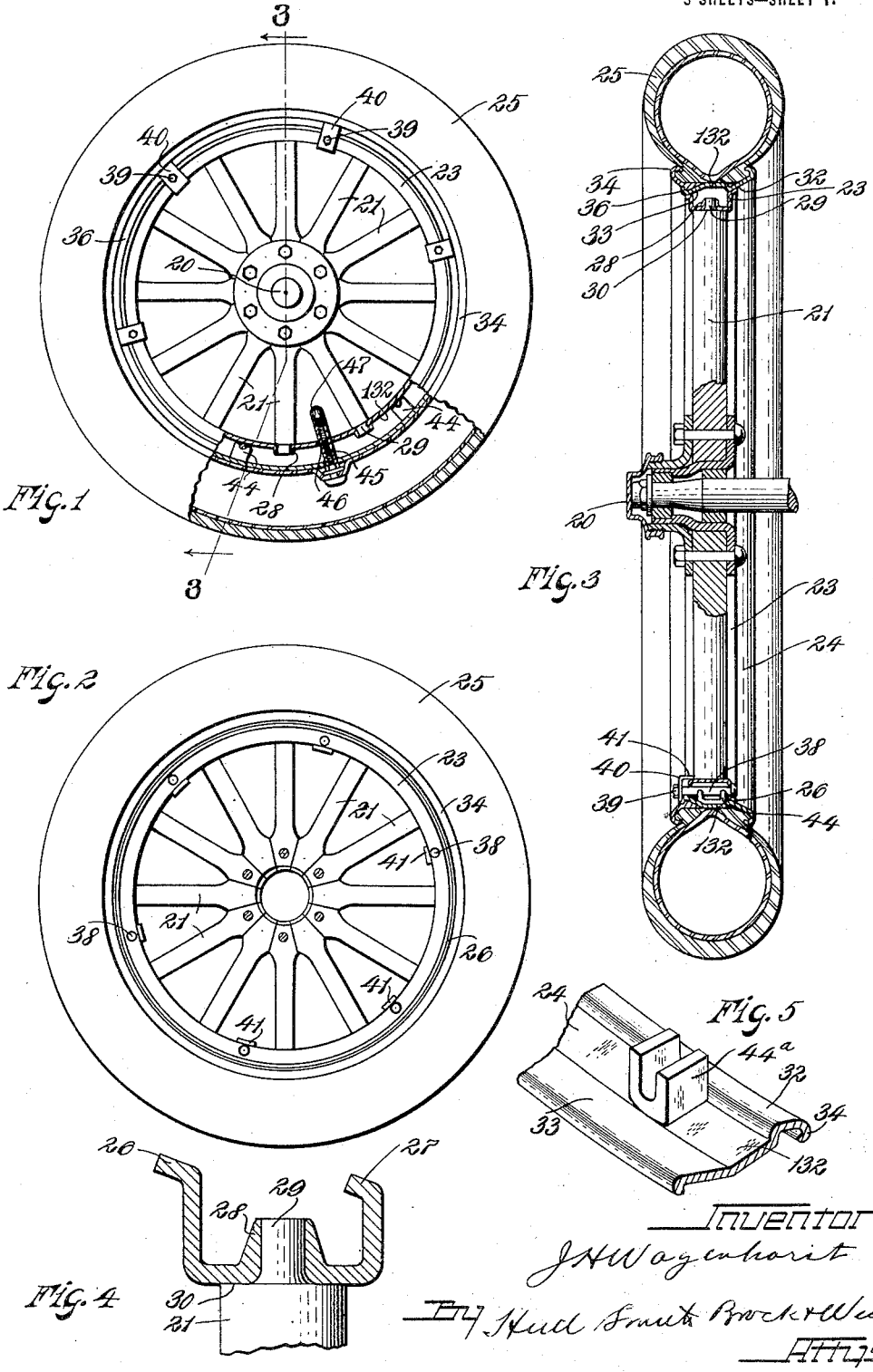

1,368,669.

Patented Feb. 15, 1921.
3 SHEETS—SHEET 2.

Inventor
J H Wagenhorst
By Hull Smith Brock & West
Attys.

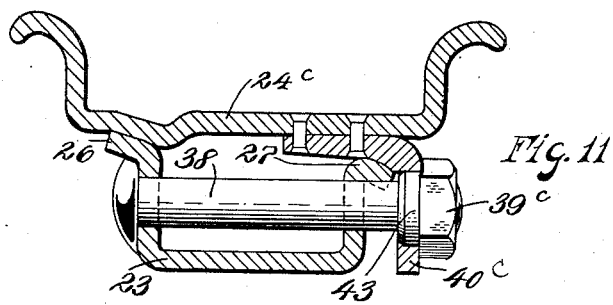
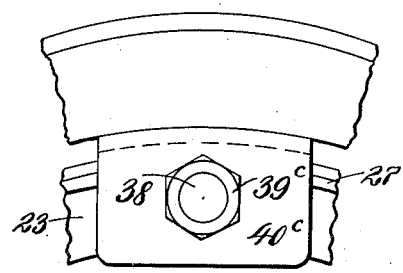
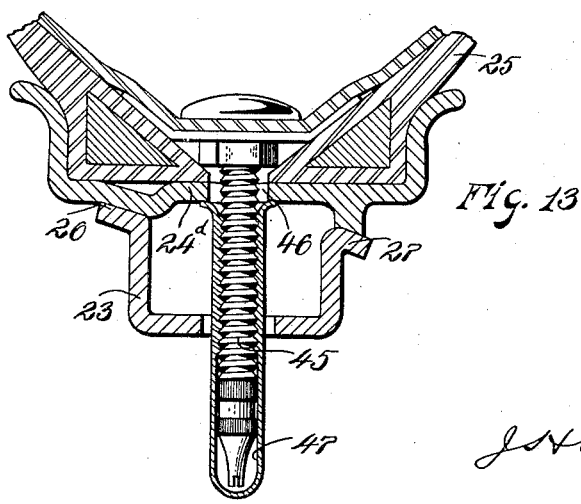

UNITED STATES PATENT OFFICE.

JAMES H. WAGENHORST, OF AKRON, OHIO, ASSIGNOR TO THE B. F. GOODRICH COMPANY, OF NEW YORK, N. Y., A CORPORATION OF NEW YORK.

DEMOUNTABLE-RIM FASTENING.

1,368,669.  Specification of Letters Patent.  Patented Feb. 15, 1921.

Application filed October 4, 1915. Serial No. 53,975.

*To all whom it may concern:*

Be it known that I, JAMES H. WAGENHORST, a citizen of the United States, residing at Akron, in the county of Summit and State of Ohio, have invented a certain new and useful Improvement in Demountable-Rim Fastenings, of which the following is a full, clear, and exact description, reference being had to the accompanying drawings.

This invention relates to demountable rim fastenings for vehicle wheels and especially for those provided with channeled metal fellies.

The principal object of my invention is to provide improved means for supporting and securing a demountable tire-holding rim upon a wheel felly, especially a channeled metal felly, and it includes a novel form of bolted clamp or clip for securing the rim in place, and a form of felly which, in connection with a suitably-constructed rim, will furnish greater security than is attainable with the same kind of rim used with a wooden felly or other forms of metal fellies.

Other and incidental advantages obtained by my invention will appear from the following description.

Of the accompanying drawings,

Figure 1 represents a side elevation of a pneumatic-tired wheel constructed according to my invention, partly broken away.

Fig. 2 represents an elevation of the opposite side, omitting the hub.

Fig. 3 represents a section on the line 3—3 of Fig. 1.

Fig. 4 represents a cross-section of the felly and spoke connection on a larger scale.

Fig. 5 represents a detail perspective view of a driving lug.

Fig. 11 represents a cross-sectional view showing another modification in the form of rim support.

Fig. 12 represents a side view of the latter.

Fig. 13 represents a cross-sectional view illustrating the preferred way of mounting the valve-stem cap.

Figures 7, 8:
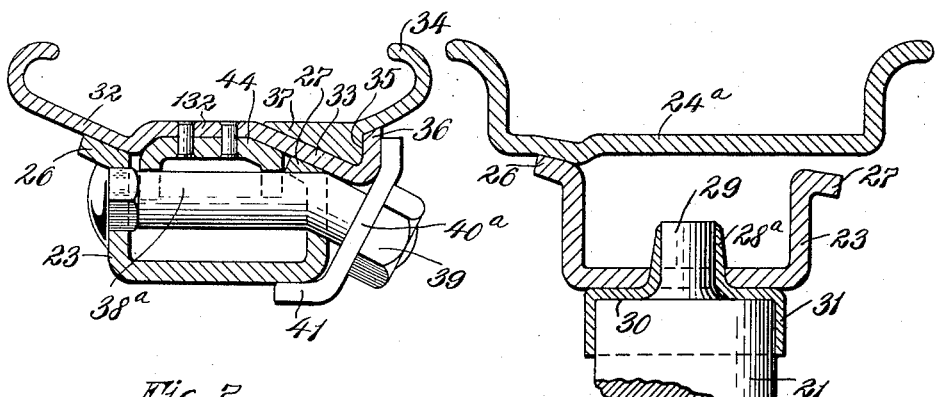
Fig. 7 represents a view similar to Fig. 6 showing a modified bolt.
Fig. 8 represents a cross-sectional view showing a modified spoke connection.

In the drawings, 20 is the wheel hub which may be of any suitable construction, 21, 21 are wooden spokes, 23 is the channeled metal felly or fixed rim, 24 is the demountable tire-carrying rim, and 25 is the pnumatic tire on said rim.

The felly is rolled from a single piece of sheet metal, and the ends joined by welding or brazing to make a continuous circular felly. The felly thus rolled is preferably made with a substantially flat or cylindrical base, parallel sides, and laterally turned flanges 26, 27, of which the former is on a greater diameter than the latter, so that the rim 24 may be readily mounted and demounted. Preferably the flange 26 on the high side is always turned outwardly, and the other flange 27 turned inwardly as in Figs. 1, 4, 6 and 7, but sometimes I turn the flange 27 outwardly as in Figs. 8, 9, 11 and 13 and may otherwise vary the construction in this respect. These flanges serve primarily to provide supporting surfaces for the rim of greater width than the thickness of the metal walls, but they also serve the purpose of stiffening the felly both radially and laterally as a whole, and the flange 26 stiffens the longer side-wall against the bending action of the clamping bolts, as hereinafter described. An advantage thus gained is the ability to use comparatively thin metal for the sake of lightness and cheapness without sacrificing strength.

Figs. 1, 2, 3, 5, 6 and 7 represent a clencher rim 24 with solid base 132 rolled with inclined depressions 32, 33 to fit the complemental flanges 26, 27 on the felly, together with a split detachable side-ring 34 having an annular shoulder 35 on its inner side engaging the retaining flange 36 on the rim-base, and an elongated toe 37 extending laterally inward under the toe of the tire-bead, whereby I am enabled to dispense with any separate retaining ring or other fastening for said ring 36.

The felly is drilled transversely to receive the retaining bolts 38 which have nuts 39 on one end engaging retaining clamps or clips 40 for drawing the rim laterally upon the felly and causing the complemental inclined supporting surfaces to be forced firmly into contact. The heads on the left-hand ends of the bolts cause the left-hand wall of the felly, Fig. 6, and its flange 26, to bend or yield slightly by this drawing action and insure a tight seating of the rim on said flange for considerable distances circumferentially on either side of each bolt-head, a result which is hard to secure with an unyielding felly-band such as is used on wood fellies or with other types of metal fellies, because of the difficulty of making the seating surfaces on the rim the exact distance apart of the complemental surfaces on the felly.

Each clamp 40 has a horizontal portion 41 adapted to slide upon the inner surface of the felly and prevent it from rocking, whereby I am enabled to utilize the entire direct pull of the nut without multiplying the motion and thus dividing the power as with the fulcrumed type of clamp. As there is less variation in the diameters of a metal felly of this type than is encountered in wood fellies owing to the process of manufacture, clamps of this type can be readily employed, of uniform size and interchangeable.

Figures 6, 9:
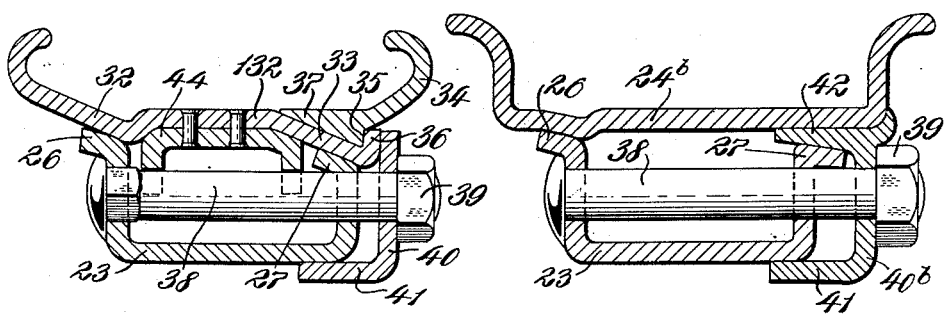
Fig. 6 represents a transverse section of the felly and rim.
Fig. 9 represents a cross-sectional view showing a modified form of rim support on one side.

The bolts 38 are straight and the clamps 40 are L-shaped in Figs. 1 and 6. In Fig. 7 the nut-end of the bolt 38ª is bent or inclined and the middle of clamp 40ª correspondingly inclined.

In Fig. 9 I have shown a detachable clamp 40ᵇ provided with the feature 41 but having a wedge portion 42 inserted between the rim 24ᵇ and the felly-flange 27.

In Figs. 11 and 12 is shown a wedge-clamp 40ᶜ riveted to the rim 24ᶜ, the nut 39ᶜ having a round or taper ended shoulder 43 for centering in a hole in the clamp.

Figure 10:
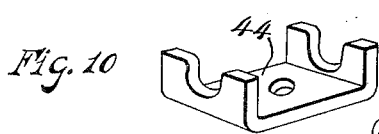
Fig. 10 represents a perspective view of one of the driving lugs which I prefer to employ.

Driving-lugs on the rim are conveniently engaged with the bolts 38. I prefer the U-shaped lugs 44, shown in Figs. 1, 6 and 10, bent into form and welded, riveted or otherwise secured to the under side of the rim, and may employ two of these lugs as indicated in Fig. 1, on opposite sides of the tire valve to aid in keeping the rim concentric with the felly when it is being mounted thereon.

Fig. 5 shows a modified form of driving lug 44ª.

To avoid the necessity of detaching the cap or other nut on the valve-stem of the tire when the rim is demounted, I prefer to pass said stem 45 through an enlarged hole 46 in the inner wall of the felly as indicated in Fig. 13 and screw the cap-nut 47 directly against the bottom of the rim 24ᵈ.

Various other modifications may be made within the scope of my invention.

I claim:

1. In a wheel, the combination of a fixed rim and a demountable rim having two pairs of substantially continuous, coacting, annular seating surfaces of different diameters, the fixed rim being an outwardly-open, channeled, metallic structure of approximate U-section provided with a slightly-flexible side wall having a conical flange on which is formed its seating surface of greater diameter, and clamping bolts passing transversely through the side walls of the fixed rim and at one end engaging the demountable rim to force its seating surfaces into those of the fixed rim, said flexible wall being free to be slightly deformed laterally by the drawing action of the other ends of the bolts.

2. In a wheel, the combination of a fixed rim, a demountable rim supported thereon, and transverse bolts for holding said demountable rim in place, said bolts being provided with clamps engaging the demountable rim and having guiding portions adapted for transverse sliding engagement with the inner periphery of the fixed rim.

3. In a wheel, the combination of a fixed rim, a demountable rim supported thereon, and straight-stem, transverse bolts for holding said demountable rim in place, said bolts having L-shaped clamps provided with guiding portions in sliding engagement with the inner periphery of the fixed rim, and adapted for indefinite inward or clamping movement thereon until the demountable rim is laterally seated, whereby substantially the full force of the bolt nuts is transmitted through said clamps to the demountable rim.

In testimony whereof, I have hereunto affixed my signature.

JAMES H. WAGENHORST.